(12) United States Patent
Luss et al.

(10) Patent No.: US 8,116,269 B2
(45) Date of Patent: Feb. 14, 2012

(54) METHODS FOR OPTIMAL MULTI-CHANNEL ASSIGNMENTS IN VEHICULAR AD-HOC NETWORKS

(75) Inventors: Hanan Luss, Marlboro, NJ (US); Wai Chen, Parsippany, NJ (US); Toshiro Hikita, Yokohama (JP); Ryokichi Onishi, Jersey City, NJ (US)

(73) Assignees: Telcordia Technologies, Inc., Piscataway, NJ (US); Toyota Infotechnology Center, U.S.A., Inc., Palo Alto, CA (US)

( * ) Notice: Subject to any disclaimer, the term of this patent is extended or adjusted under 35 U.S.C. 154(b) by 970 days.

(21) Appl. No.: 11/800,849

(22) Filed: May 8, 2007

(65) Prior Publication Data
US 2008/0279141 A1   Nov. 13, 2008

(51) Int. Cl.
*H04W 4/00* (2009.01)
(52) U.S. Cl. ........................................ 370/329; 455/450
(58) Field of Classification Search .......... 370/328–337, 370/395.21–395.43; 455/450–454, 464, 455/509–514
See application file for complete search history.

(56) References Cited

U.S. PATENT DOCUMENTS

| | | | | |
|---|---|---|---|---|
| 6,990,087 | B2 * | 1/2006 | Rao et al. ....................... | 370/330 |
| 2002/0163889 | A1 * | 11/2002 | Yemini et al. ................... | 370/238 |
| 2003/0210680 | A1 * | 11/2003 | Rao et al. ....................... | 370/352 |
| 2005/0271006 | A1 * | 12/2005 | Chari et al. ..................... | 370/329 |
| 2006/0133289 | A1 * | 6/2006 | Golle et al. ..................... | 370/338 |
| 2006/0153099 | A1 * | 7/2006 | Feldman et al. ............... | 370/328 |
| 2006/0215593 | A1 * | 9/2006 | Wang et al. ..................... | 370/328 |
| 2009/0175238 | A1 * | 7/2009 | Jetcheva et al. ................ | 370/329 |

OTHER PUBLICATIONS

Changchun Xu, Kezhong Liu, Yong Yuan, Gan Liu, "A Novel Multi-Channel Based Framework for Wireless IEEE 802.11 Ad Hoc Networks", Asian Journal of Information Technology 5 (1) :44-47, 2006.
Wai Chen, Shengwai Cai, "Ad Hoc Peer-to-Peer Network Architecture for Vehicle Safety Communications", IEEE Communications Magazine, Apr. 2005, 100-107.
International Search Report, dated Apr. 24, 2008 (2 pages).

* cited by examiner

*Primary Examiner* — Kent Chang
*Assistant Examiner* — Kashif Siddiqui
(74) *Attorney, Agent, or Firm* — Philip J. Feig

(57) ABSTRACT

A communications path is established among an ordered sequence of moving nodes, representing vehicles. Available channels may differ from one node to the next node and a node cannot use the same channel for both receiving and transmitting information. Three methods are described that provide an optimal sequence of channel assignments between the nodes. A sequence of channel assignments is called optimal if it establishes a communications path from the first node in the sequence to the last node in the sequence, or, if such a path does not exist, from the first node to the farthest node possible in the sequence. The first method uses a depth-first search starting from the first node in the sequence. The second method uses a "look ahead" scheme in the depth-first search method. The third method requires only a single pass through the sequence of nodes by identifying optimal channel assignments in subsequences of nodes without a need for backtracking.

5 Claims, 4 Drawing Sheets

METHODS FOR OPTIMAL MULTI-CHANNEL ASSIGNMENTS IN VEHICULAR AD-HOC NETWORKS

FIELD OF INVENTION

The present invention relates to channel assignments in mobile ad-hoc networks and more specifically, the invention concerns assignment of channels in ad-hoc vehicular networks comprising an ordered sequence of moving vehicles.

BACKGROUND OF THE INVENTION

A mobile ad-hoc network (MANET) is formed by multiple moving nodes equipped with wireless transceivers. The mobile nodes communicate with each other through multi-hop wireless links, wherein every node can transmit and receive information. Mobile ad-hoc networks have become increasingly important in areas where deployment of communications infrastructure is difficult. Such networks are used for communications in battle fields, natural disasters, fleets on the ocean, and so forth Numerous papers have been published on this topic. For example, C. Xu, K. Liu, Y. Yuan, and G. Liu, "A Novel Multi-Channel Based Framework for Wireless IEEE 802.11 Ad Hoc Networks", *Asian Journal of Information Technology*, 5, 44-47, 2006 describe a framework for multi-channel management in such networks.

A vehicular ad-hoc network (VANET) refers to a mobile ad-hoc network designed to provide communications among nearby vehicles and between vehicles and nearby fixed equipment. W. Chen and S. Cai, "Ad Hoc Peer-to-Peer Network Architecture for Vehicle Safety Communications", *IEEE Communications Magazine*, 100-107, April 2005 present background material and a networking approach that uses local peer group architecture in order to establish communications among vehicles.

The use of multiple channels allows for simultaneous communications among a network of moving nodes, representing vehicles, and increases the network throughput. Existing channel assignment methods use distributed decisions wherein each node determines which channel to use based on local information on channel availability at neighboring nodes.

The present invention focuses on establishing a communications path among an ordered sequence of moving nodes, representing vehicles. The ordered sequence of nodes can be viewed as a directed linear tree topology where a link interconnects a node only to its successor node in the ordered sequence. A channel is used to send information from one node to the next on a wireless link. The set of available channels may differ from one node to the next due to external interferences, other ongoing communications that involve some of these nodes, different equipment used at the nodes, and the like. Each of the available channels at a node can be used for receiving information from its predecessor node in the sequence or for transmitting information to its successor node in the sequence. However, the same channel cannot be used at a node for both receiving information from its predecessor node and transmitting information to its successor node in the ordered sequence of nodes. Note that the channel used to transmit information from some node is the channel used to receive information at its successor node in the ordered sequence of nodes. The first node in the sequence, or some nearby system, has as input the information of the set of available channels at each of the nodes in the ordered sequence. The invention provides methods that determine an optimal sequence of channels assigned to the wireless links that interconnect the ordered sequence of nodes. A sequence of channel assignments is called optimal if it establishes a communications path from the first node in the ordered sequence of nodes to the last node in that sequence, or, if such a path does not exist, it establishes a communications path from the first node to the farthest node possible.

The invention uses global information from all nodes in the sequence to come up with a globally optimal sequence of channel assignments. Current systems use distributed methods wherein each node selects a channel for transmitting information using information from only a subset of nodes.

SUMMARY OF INVENTION

The present invention focuses on establishing a communications path among an ordered sequence of moving nodes, representing vehicles. The sequence of nodes can be viewed as a directed linear tree topology where a link interconnects a node only to its successor node in the ordered sequence. A channel is used to send information from one node to the next node on a wireless link. The set of available channels may differ from one node to the next node. Each of the available channels at a node can be used for receiving information from its predecessor node in the sequence or for transmitting information to its successor node in the sequence. However, the same channel cannot be used at a node for both receiving and transmitting information. Using information regarding the set of available channels at each of the nodes in the ordered sequence of nodes, the invention provides methods that determine an optimal sequence of channels assigned to the wireless links connecting the nodes. A sequence of channel assignments is called optimal if it establishes a communications path from the first node in the ordered sequence to the last one, or, if such a path does not exist, it establishes a communications path from the first node in the ordered sequence to the farthest node possible. The present invention describes three methods that find an optimal sequence of channel assignments. The first method uses a depth-first search starting from the first node in the sequence. The second method improves upon the channel selection rule in a node by using a "look ahead" scheme that may reduce the computational effort of the depth-first search method. The third method requires only a single pass through the sequence of nodes by identifying optimal channel assignments in subsequences of nodes without a need for backtracking, resulting in computational effort that is proportional to the number of nodes in the ordered sequence of nodes.

The present invention will be more clearly understood when the following description is read in conjunction with the accompanying drawings.

DETAILED DESCRIPTION

Figure 1:
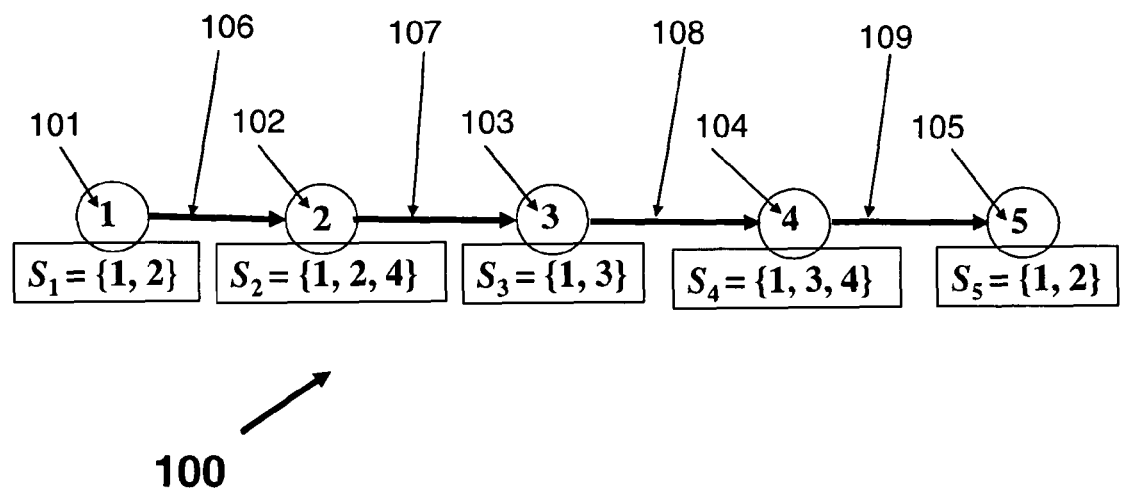
FIG. 1 illustrates an ordered sequence of nodes, shown as a directed linear tree network, and the sets of available channels.

Referring now to the figures and FIG. 1 in particular, there is shown an example 100 of an ordered sequence of five nodes 101-105, also labeled as nodes 1-5. The nodes represent moving vehicles and the links 106-109 represent wireless links interconnecting the nodes. For example, link 106 connects node 1 to node 2, link 107 connects node 2 to node 3, and so forth. Note that the network comprising the nodes and links can be viewed as a directed linear tree. Each node has a set of channels available for receiving or transmitting information where the term channel is used as a logical entity. It may represent a frequency band (under FDMA), an orthogonal code (under CDMA), and the like. The set of available channels may differ from one node to the next due to external interferences, other ongoing communications that involve some of these nodes, different equipment used at the nodes, and so forth. For example, node 1 (101) can use channels 1 and 2, as depicted by the set $S_1=\{1, 2\}$, node 2 (102) can use channels 1, 2 and 4 as depicted by the set $S_2=\{1, 2, 4\}$, and so forth. The information of all sets $S_i$, i=1, 2, 3, 4 and 5 is provided as input to the channel assignment methods. Typically, the input will be available at node 1, however, it may be available at some other location, e.g., at nearby fixed devices. The channel assignment methods are generic and independent of the location of the input. The objective is to establish, if possible, a communications path that connects node 1 to node 5. If such a communications path cannot be established, the objective is to establish a communications path starting at node 1 to the farthest node along the ordered sequence of nodes. Node i may use for receiving or transmitting information only channels included in the set $S_i$, and the channel selected on the incoming link into node i must differ from that selected on the outgoing link from node i.

The invention provides three methods that find an optimal sequence of channels assigned to the interconnecting links wherein an optimal sequence of channels establishes a communications path from node 1 to the farthest possible node along the ordered sequence of nodes. The farthest node may be node N or some node i<N. Each of the methods provide an optimal sequence of channels, however, they may require different computational effort.

Let $S_i$ denote the set of available channels at node i where the sets $S_i$ for i=1, 2, . . . , N are provided as input for an ordered sequence of N nodes. Let $T_i$ denote the set of available channels at node i and at node i+1, i.e., $T_i=S_i \cap S_{i+1}$. The sets $T_i$ for i=1, 2, . . . , N−1 are readily computed from the sets $S_i$ for i=1, 2, . . . , N. Since node i must use on its outgoing link a channel that is in $S_i$ and node i+1 must use on its incoming link a channel that is in $S_{i+1}$, node i can interconnect with node i+1 only on channels that are in the set $T_i$. Let $f_i$ denote the channel used for transmission from node i to node i+1. In addition, node i must use different channels for receiving information from node i−1 and for transmitting information to node i+1. Let $FEAS_i$ denote the set of channels that can be used to transmit information from node i and received by node i+1, given that node i−1 communicates with node i on channel $f_{i-1}$. Thus, $FEAS_1=T_1$ and $FEAS_i=T_i-f_{i-1}$ for i>1. Note that if each of the sets $T_i$ has two or more channels, a sequence of channels that connects node 1 to node N can trivially be assigned through arbitrary selection, starting from node 1. The challenge is to determine optimal assignments when some of the sets $T_i$ include only one channel. Obviously, if some $T_i$ does not include any channel, a feasible communications path cannot be established beyond that node.

The Depth-First Search Method (DFSM)

Figure 2:
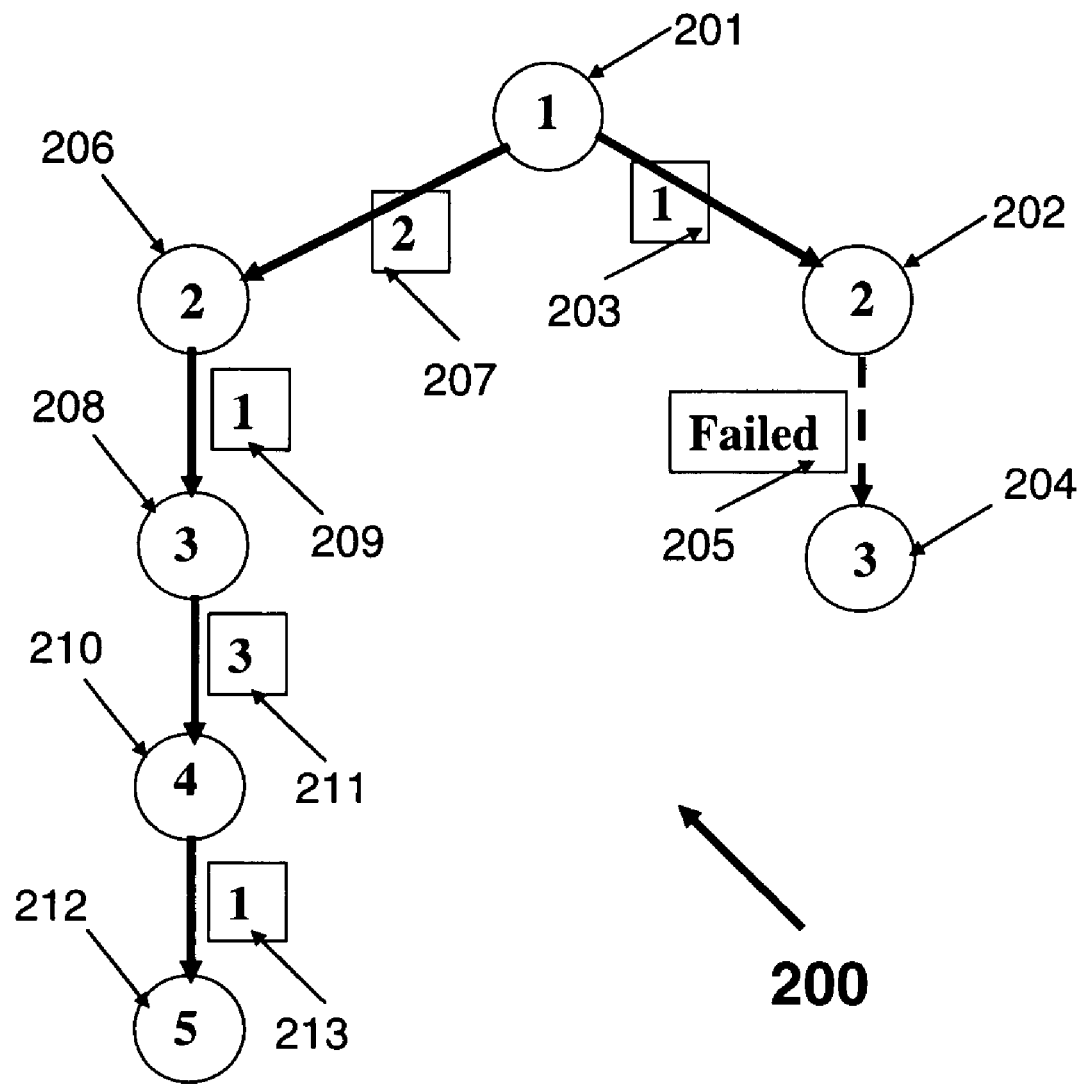
FIG. 2 shows an example of the Depth-First Search Method.

Referring now to FIG. 2, there is shown an example of the Depth-First Search Method (DFSM) 200 applied to the ordered sequence of five nodes described in connection with example 100 with $S_1=\{1, 2\}$, $S_2=\{1, 2, 4\}$, $S_3=\{1, 3\}$, $S_4=\{1, 3, 4\}$, and $S_5=\{1, 2\}$. The DFSM method computes from the sets $S_i$ the sets $T_i=S_i \cap S_{i+1}$, in particular, $T_1=\{1, 2\}$, $T_2=\{1\}$, $T_3=\{1, 3\}$, and $T_4=\{1\}$. The method builds a search tree as follows. The method starts with node 1 (201), selecting a channel from the set $T_1$ as the candidate channel on the link from node 1 (201) to node 2 (202), using some specified rule, e.g., random selection, the largest or smallest channel index, and so forth. Suppose the method selects channel 1, as depicted by 203. Channel 1 is now deleted from the set $T_2$ since the channel used on the outgoing link from node 2 must differ from the channel used on the input to the node, i.e., channel 1. Since the set $T_2$ is now empty, there is no available channel to connect node 2 (202) to node 3 (204). So the search on this branch of the tree failed as depicted by 205.

The method then backtracks from 202 to 201 and channel 1 is deleted from set $T_1$. The method now selects the remaining channel in $T_1$, i.e., channel 2, to connect node 1 (201) to node 2 (206) as depicted by 207.

Since channel 2 is not in $T_2$, the set $T_2$ remains unchanged. Next, the method selects channel 1, as depicted by 209 to connect node 2 (206) to node 3 (208). Channel 1 is deleted now from $T_3$ and, as depicted by 211, the method selects channel 3 (211) to connect node 3 (208) to node 4 (210). Since channel 3 is not in $T_4$, the set $T_4$ remains unchanged. The method now selects channel 1, as depicted by 213 to connect node 4 (210) to node 5 (212).

The method succeeded in finding an optimal sequence of channels that establishes a communications path that connects node 1 to node 5. The path uses channel 2 on the link from node 1 to node 2, channel 1 on the link from node 2 to node 3, channel 3 on the link from node 3 to node 4, and channel 1 on the link from node 4 to node 5.

The Depth-First Search Method, referred to as DFSM, is summarized as follows:

```
DFSM
Initialization
    Compute sets T_i = S_i ∩ S_{i+1} for i = 1, 2, ..., N − 1.
    N ← minimum[N, smallest i with T_i = Ø] (a communications path
    cannot be established from node 1 to a node beyond the revised N).
    Initialize sets TEMP = BEST = Ø (TEMP is the interim sequence
    of channels from node 1 to the currently reached node, and BEST
    records the longest sequence of channels found since the
    beginning of the search).
    Initialize i = 1.
End of initialization.
While i < N
    FEAS_i = T_i − f_{i−1} ( for i = 1, FEAS_i = T_i).
    If FEAS_1 = Ø, STOP (the set BEST provides the longest
    possible sequence of channels; at this stopping point the optimal
    communications path does not reach node N).
    If FEAS_i = Ø (i > 1), backtracking is needed:
    Begin
        If the sequence of channels in TEMP is longer than
        that in BEST,
        then BEST ← TEMP.
        Update T_{i−1} ← T_{i−1} − f_{i−1}.
        Update TEMP ← TEMP − f_{i−1}.
        Update i ← i − 1.
        Go to beginning of the while loop.
    End.
    FEAS_i ≠ Ø: Select channel on next link.
    Begin
        Select channel f_i ∈ FEAS_i for transmitting from node i to
        node i + 1 using an arbitrary rule (e.g., random selection).
        Update TEMP ← TEMP + f_i.
        Update i ← i + 1.
    End.
End of while loop.
BEST ← TEMP (at this stopping point the set BEST provides a
communications path that connects node 1 to node N).
STOP.
End of DFSM.
```

The Enhanced Depth-First Search Method (EDFSM)

Figure 3:
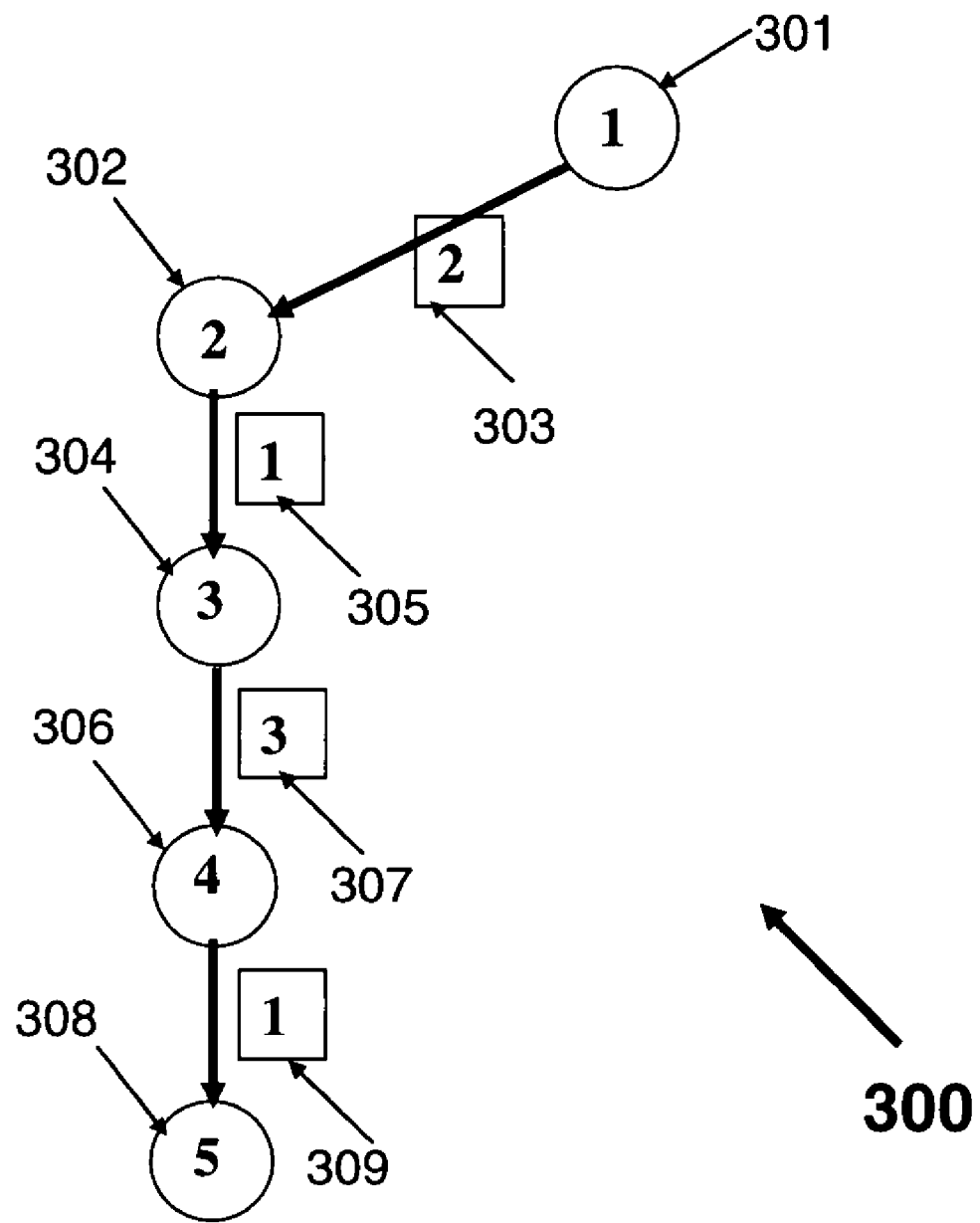
FIG. 3 shows an example of the Enhanced Depth-First Search Method.

Referring now to FIG. 3, there is shown an example of the Enhanced Depth-First Search Method (EDFSM) 300 applied to the same ordered sequence of five nodes described in example 100 with $S_1=\{1, 2\}$, $S_2=\{1, 2, 4\}$, $S_3=\{1, 3\}$, $S_4=\{1, 3, 4\}$, and $S_5=\{1, 2\}$. The method computes from the sets $S_i$ the sets $T_i=S_i \cap S_{i+1}$, in particular, $T_1=\{1, 2\}$, $T_2=\{1\}$, $T_3=\{1, 3\}$, and $T_4=\{1\}$. EDFSM builds a search tree in the same way as DFSM. However, EDFSM uses a "look-ahead" rule to select a channel from the channels in the set $FEAS_i$. The EDFSM method first examines whether the set $FEAS_i$ includes a channel that is not in the set $T_{i+1}$, and if so it selects such a channel. Note that selecting such a channel does not decrease the selection options $FEAS_{i+1}$ at node i+1. If such a channel does not exist, the same rule used in DFSM will be used.

Referring to FIG. 3, the method starts with selecting a channel from the set $FEAS_1=T_1$ as the candidate channel on the link from node 1 (301) to node 2 (302). Since channel 2 is the only channel in $T_1$ that is not in $T_2$, the method selects channel 2, as depicted by 303, to connect node 1 (301) to node 2 (302). Note that by using this "look-ahead" rule we did not select channel 1 which would lead to a failure to establish a connection from node 2 to node 3 as previously demonstrated in example 200.

The remaining steps of the search in example 300 are the same as that shown in example 200. Since channel 2 is not in $T_2$, the set $T_2$ remains unchanged. Next, the method selects channel 1, as depicted by 305 to connect node 2 (302) to node 3 (304). Channel 1 is deleted now from $T_3$ and, as depicted by 307, the method selects channel 3 to connect node 3 (304) to node 4 (306). Since channel 3 is not in $T_4$, the set $T_4$ remains unchanged. The method now selects channel 1, as depicted by 309 to connect node 4 (306) to node 5 (308).

EDFSM succeeded in finding an optimal sequence of channels that establishes a communications path from node 1 to node 5. This is the same sequence found by using the DFSM method in example 200. The path uses channel 2 from node 1 to node 2, channel 1 form node 2 to node 3, channel 3 from node 3 to node 4, and channel 1 from node 4 to node 5. EDFSM requires, in general, less computational effort than DFSM since the "look-ahead" rule may prevent selection of channels that would lead to backtracking on the search tree. Note, however, that EDFSM may still require backtracking. This can be easily demonstrated by adding another node, referred to as node 1', between node 1 and node 2 with the set $S_{1'}=S_1$. Now, starting at node 1, the "look-ahead" rule does not provide any guidance at node 1. If channel 2 is selected at node 1, channel 1 must be selected at node 1', and no channel would be available to connect node 2 to node 3. Backtracking on the search tree would then be required.

The Enhanced Depth-First Search Method, referred to as EDFSM, is as follows:

```
EDFSM
Initialization
    Compute sets T_i = S_i ∩ S_{i+1} for i = 1, 2, ..., N – 1.
    N ← minimum[N, smallest i with T_i = Ø] (a communications path
    cannot be established from node 1 to a node beyond the revised N).
    Initialize sets TEMP = BEST = Ø (TEMP is the interim sequence
    of channels from node 1 to the currently reached node, and BEST
    records the longest sequence of channels found since the
    beginning of the search).
    Initialize i = 1.
End of initialization.
While i < N
```

-continued

```
    FEAS_i = T_i – f_{i–1} ( for i = 1, FEAS_i = T_i).
    If FEAS_1 = Ø, STOP (the set BEST provides the longest
    possible sequence of channels; at this stopping point the optimal
    communications path does not reach node N).
    If FEAS_i = Ø (i > 1), backtracking is needed:
    Begin
        If the sequence of channels in TEMP is longer than
        that in BEST,
        then BEST ← TEMP.
        Update T_{i–1} ← T_{i–1} – f_{i–1}.
        Update TEMP ← TEMP – f_{i–1}.
        Update i ← i – 1.
        Go to beginning of the while loop.
    End.
    FEAS_i ≠ Ø: Select channel on next link.
    Begin
        Select channel for transmitting from node i to node i +1
        as follows:
        If available, select some f_i ∈ FEAS_i\T_{i+1} (i.e., f_i is in FEAS_i
        but not in T_{i+1}); otherwise, select some f_i ∈ FEAS_i using
        an arbitrary rule (e.g., random selection).
        Update TEMP ← TEMP + f_i.
        Update i ← i + 1.
    End.
End of while loop.
BEST ← TEMP (at this stopping point the set BEST provides a
communications path that connects node 1 to node N).
STOP.
End of EDFSM.
```

The One-Pass Method (OPM)

Figure 4:
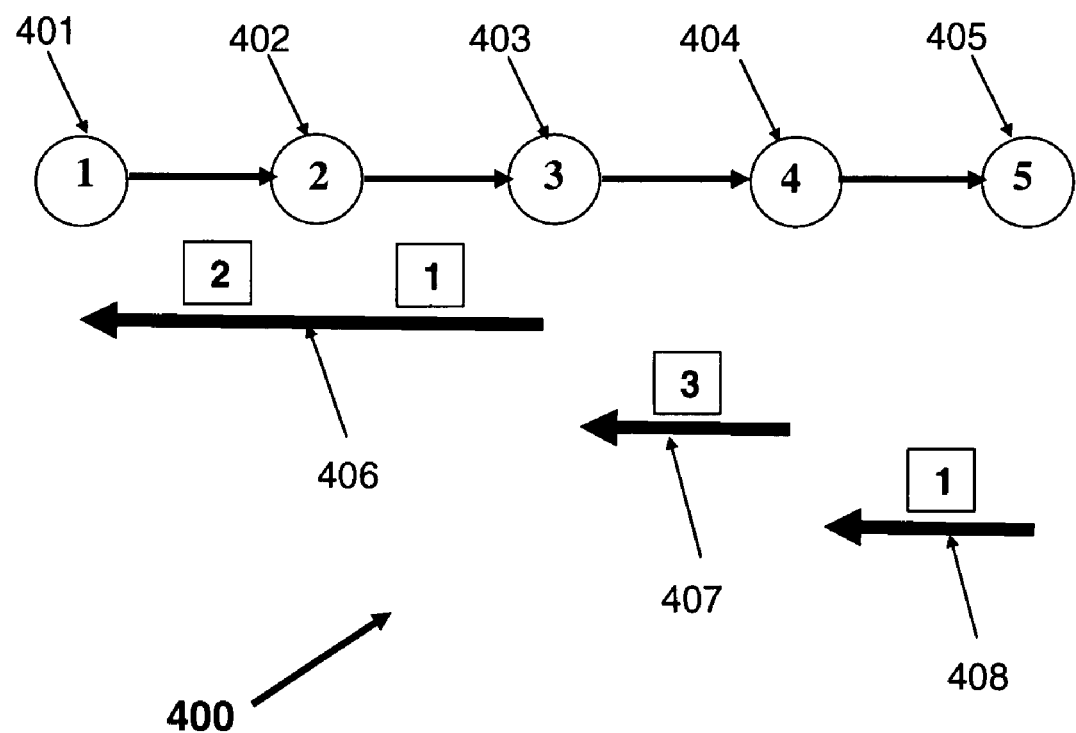
FIG. 4 shows an example of the One Path Method.

Referring now to FIG. 4, there is shown an example 400 of the One Pass Method (OPM) applied to the same ordered sequence of five nodes described in example 100 with $S_1=\{1, 2\}$, $S_2=\{1, 2, 4\}$, $S_3=\{1, 3\}$, $S_4=\{1, 3, 4\}$, and $S_5=\{1, 2\}$. The method computes from the sets $S_i$ the sets $T_i$, in particular, $T_1=\{1, 2\}$, $T_2=\{1\}$, $T_3=\{1, 3\}$, and $T_4=\{1\}$.

Starting from node 1 (401), set $T_2=\{1\}$ is the first set with a single channel. Therefore, moving backwards, the method selects channel 1 on the link from node 2 (402) to node 3 (403), updates $T_1$ by deleting channel 1 from $T_1$, which results in $T_1=\{2\}$, and selects channel 2 on the link from node 1 (401) to node 2 (402). The selection of channels on this subsequence is depicted by 406. Channel 1 is also deleted from set $T_3$, leading to $T_3=\{3\}$. The direction of the arrow in 406 emphasizes that the subsequence of channels assigned to the links is determined backwards, i.e., first for the link connecting node 2 to node 3 and then for the link connecting node 1 to node 2.

Next, starting from node 3 (403), $T_3=\{3\}$ is the first set with a single channel. Therefore, the second subsequence includes only a single link and the method selects, as depicted by 407, channel 3 on the link from node 3 (403) to node 4 (404). Since $T_4$ does not include channel 3, no update is needed.

Finally, starting from node 4 (404), node 5 (405) is reached. As depicted by 408, channel 1 is selected from node 4 (404) to node 5 (405).

The OPM method succeeded in finding an optimal sequence of channels that establishes a communications path from node 1 to node 5. This is the same sequence found by DFSM and EDFSM. The path uses channel 2 from node 1 to node 2, channel 1 form node 2 to node 3, channel 3 from node 3 to node 4, and channel 1 from node 4 to node 5.

The OPM method does not build a search tree. Instead, it looks for the first node, say node m, along the ordered sequence of nodes that has a single channel in the set $T_m$ and assigns the channel in $T_m$ to the link connecting nodes m to node m+1 The assigned channel is deleted from set $T_{m-1}$. It then proceeds to node m–1 and arbitrarily assigns a channel from set $T_{m-1}$ to the link connecting node m–1 to node m. The method continues in that manner until a channel is assigned to the link connecting node 1 to node 2. Assignment of channels to the links along the path that connects node 1 to node m+1 is completed. Note that the backwards assignment of channels to interconnect the subsequence of nodes 1 to m+1 is guaranteed to succeed since each of the sets $T_i$ for i=m−1, m−2, . . . , 1 has at least two channels.

If node m=N−1, the OPM method terminates since a path is established from node 1 to node N. Suppose m<N−1. The assigned channel on the link into node m+1 is deleted from set $T_{m+1}$ and OPM searches for the next node in the ordered sequence beyond node m, say node n, that has a single channel in the set $T_n$. OPM then assigns channels to the subsequence of links that connect node n to node n+1, node n−1 to node n, . . . , node m+1 to node m+2.

The OPM method continues to assign channels to such subsequences until a path that connects node 1 to node N is established or until some set, say $T_p$, is encountered with $T_p=\emptyset$. In the latter case, a communications path can be established only from node 1 to node p.

Note that a subsequence with node N as its last node may have more than one channel in $T_{N-1}$, in which case the OPM method arbitrarily assigns one of these channels to the link connecting node N−1 to node N.

The OPM method will find an optimal sequence in an effort that is proportional to the number of nodes, i.e., in an effort of O(N) (after computing the sets $T_i$). The sequence found will generate a communications path from node 1 to node N, or, if not possible, from node 1 to the farthest node possible along the ordered sequence of nodes.

Let $|T_i|$ denote the number of channels in the set $T_i$. The One Path Method, referred to as OPM, is as follows:

---

OPM
Initialization
    $T_i = S_i \cap S_{i+1}$ for i = 1, 2, ..., N − 1.
    N ← minimum[N, smallest i with $T_i = \emptyset$] (a communications path cannot be established from node 1 to a node beyond the revised N).
    MIN = 1.
End of initialization.
Subsequence Channel Assignment
    MAX = [i: Smallest i ≧ MIN with $|T_i| = 1$]; if no $|T_i| = 1$ set MAX = N − 1.
    Select some $f_{MAX} \in T_{MAX}$ using an arbitrary rule (e.g., random selection).
    i = MAX.
    While i > MIN
        $T_{i-1} \leftarrow T_{i-1} - f_i$.
        Select some $f_{i-1} \in T_{i-1}$ using an arbitrary rule (e.g., random selection).
        i ← i − 1.
    End of while loop.
End of subsequence channel assignment.
Termination Checks
    MIN ← MAX + 1.
    If MIN = N, STOP (assigned channels $f_1, f_2, ..., f_{N-1}$ provides a communications path from node 1 to node N).
    $T_{MIN} \leftarrow T_{MIN} - f_{MIN-1}$.
    If $T_{MIN} = \emptyset$, STOP (assigned channels $f_1, f_2, ..., f_{MIN-1}$ provide a communications path to the farthest node possible − node MIN).
    Go to beginning of Subsequence Channel Assignment.
End of termination checks.
End of OPM.

---

Suppose channels could be assigned only up to node p<N (the initial value of N) using any of the methods DFSM, EDFSM or OPM (all three methods will establish a communications path to the farthest possible node). Since the sets $S_i$ may change quite rapidly, it may be desired to establish a partial path up to node p and re-execute a channel assignment method, starting from node p, after a specified time interval. A complete path from node 1 to node N may thus be established by combining several partial communications paths established through sequential executions of a channel assignment method.

The algorithms described above are capable of being performed on an instruction execution system, apparatus, or device, such as a computing device. The algorithms themselves may be contained on a computer-readable medium that can be any means that can contain, store, communicate, propagate, or transport the program for use by or in connection with an instruction execution system, apparatus, or device, such as a computer.

While there has been described and illustrated methods for optimal multi-channel assignments in ad-hoc vehicular networks comprised of an ordered sequence of moving vehicles, it will be apparent to those skilled in the art that variations and modifications are possible without deviating from the broad teachings and scope of the present invention which shall be limited solely by the scope of the claims appended hereto.

What is claimed is:

1. A method for assigning channels to wireless links interconnecting an ordered sequence of nodes, representing vehicles, comprising the steps of:
receiving information of a set of available channels at each node of an ordered sequence of nodes wherein sets of available channels at each node may be different; and
assigning channels to interconnecting links of an ordered sequence of nodes using a non-exhaustive search as specified by Enhanced Depth-First Search Method (EDFSM) where the channel assigned to any of the links is selected from among the channels included at the intersection of the sets of available channels at the two end-nodes of the respective link, and the channels assigned to any two sequential links with a joint node are different;
where the assigning channels to interconnecting links provides an optimal sequence of channel assignments between the nodes where an optimal sequence establishes a communication path from the first node in the sequence to the last node in the sequence or, if such path does not exist, from the first node in the sequence to the farthest node in the sequence that can be reached.

2. A method for assigning channels to wireless links interconnecting an ordered sequence of nodes, representing vehicles, comprising the steps of:
receiving information of a set of available channels at each node of an ordered sequence of nodes wherein sets of available channels at each node may be different; and
assigning channels to interconnecting links of an ordered sequence of nodes using a single pass search through the ordered sequence of nodes as specified by One-Pass Method (OPM) where the channel assigned to any of the links is selected from among the channels included at the intersection of the sets of available channels at the two end-nodes of the respective link, and the channels assigned to any two sequential links with a joint node are different;
where the assigning channels to interconnecting links provides an optimal sequence of channel assignments between the nodes where an optimal sequence establishes a communications path from the first node in the sequence to the last node in the sequence or, if such a path does not exist, from the first node in the sequence to the farthest node in the sequence that can be reached.

3. A method as set forth in claim 2, wherein said assigning channels to interconnecting links of an ordered sequence of nodes determines all assigned channels in a computational effort that is proportional to the number of nodes in the ordered sequence of nodes.

4. A system for providing an optimal sequence of channel assignments between an ordered sequence of nodes where an optimal sequence establishes a communications path from the first node in the sequence to the last node in the sequence or, if such a path does not exist, from the first node in the sequence to the farthest possible node along the sequence of nodes, representing vehicles, in an ad-hoc network comprising:

means for storing information of a set of available channels at each node in an ordered sequence of nodes;

means for assigning channels to interconnecting links of an ordered sequence of nodes using a non-exhaustive search as specified by Enhanced Depth-First Search Method (EDFSM) to provide an optimal sequence of channel assignments between nodes where the channel assigned to any of the links is selected from among the channels included at the intersection of the sets of available channels at the two end-nodes of the respective link, and the channels assigned to any two sequential links with a joint node are different.

5. A system for providing an optimal sequence of channel assignments between an ordered sequence of nodes where an optimal sequence establishes a communications path from the first node in the sequence to the last node in the sequence or, if such a path does not exist, from the first node in the sequence to the farthest possible node along the ordered sequence of nodes, representing vehicles, in an ad-hoc network comprising:

means for storing information of a set of available channels at each node in an ordered sequence of nodes;

means for assigning channels to interconnecting links of an ordered sequence of nodes using a single pass search through the ordered sequence of nodes as specified by One-Pass Method (OPM) to provide an optimal sequence of channel assignments between nodes where the channel assigned to any of the links is selected from among the channels included at the intersection of the sets of available channels at the two end-nodes of the respective link, and the channels assigned to any two sequential links with a joint node are different.

* * * * *